(12) United States Patent
de Groot

(10) Patent No.: US 8,426,006 B2
(45) Date of Patent: Apr. 23, 2013

(54) METHOD FOR MANUFACTURING AN OBJECT FROM A SANDWICH STRUCTURE HAVING A REINFORCED CORNER AND AN OBJECT OF THIS TYPE

(75) Inventor: Martin Th. de Groot, Driebergen (NL)

(73) Assignee: FITS Holding B.V., Driebergen (NL)

( * ) Notice: Subject to any disclaimer, the term of this patent is extended or adjusted under 35 U.S.C. 154(b) by 631 days.

(21) Appl. No.: 12/597,955

(22) PCT Filed: May 21, 2008

(86) PCT No.: PCT/NL2008/000133
§ 371 (c)(1),
(2), (4) Date: Oct. 28, 2009

(87) PCT Pub. No.: WO2008/147176
PCT Pub. Date: Dec. 4, 2008

(65) Prior Publication Data
US 2010/0129584 A1    May 27, 2010

(30) Foreign Application Priority Data
May 25, 2007    (NL) ..................... 1033895

(51) Int. Cl.
*B32B 1/04*    (2006.01)
*B32B 3/02*    (2006.01)
*B29C 53/36*    (2006.01)
*B29C 65/00*    (2006.01)

(52) U.S. Cl.
USPC .............. 428/76; 428/81; 428/174; 264/249; 264/257; 264/321; 156/198; 156/227; 156/304.3

(58) Field of Classification Search .................... 428/53, 428/81, 76, 174; 156/196, 198, 210, 223, 156/227, 304.2, 304.3, 306.6; 264/249, 321, 264/257
See application file for complete search history.

(56) References Cited

U.S. PATENT DOCUMENTS 5,979,684 A * 11/1999 Ohnishi et al. .................. 220/1.5
2006/0081628 A1 * 4/2006 Myers et al. ..................... 220/1.5

* cited by examiner

*Primary Examiner* — Donald J Loney
(74) *Attorney, Agent, or Firm* — Thomas | Horstemeyer, LLP

(57) ABSTRACT

An exemplary method for manufacturing and reinforcing a corner in an object made from a sandwich structure, having a thermoplastic core layer (18), which is arranged between two cover layers (16), at least one of which is a plastic cover layer, which method includes the steps of: producing an object including a corner between two object parts; positioning a thermoplastic core part (24) and an additional fiber-reinforced thermoplastic layer (26) in the corner, which thermoplastic core part has a shape adapted to the corner, in such a manner that the additional fiber-reinforced thermoplastic layer (26) substantially covers the exposed surface of the core part (24); and connecting a cover layer (16) of the sandwich structure to the additional fiber-reinforced thermoplastic layer (26).

14 Claims, 3 Drawing Sheets

METHOD FOR MANUFACTURING AN OBJECT FROM A SANDWICH STRUCTURE HAVING A REINFORCED CORNER AND AN OBJECT OF THIS TYPE

CROSS-REFERENCE TO RELATED APPLICATION

This national phase application claims priority to provisional application no. NL 1033895, filed 25 May 2007 and PCT application no. PCT/NL2008/000133, international filing date 21 May 2008, which is incorporated herein by reference.

BACKGROUND

1. Technical Field

According to a first aspect, the invention relates to a method for manufacturing and reinforcing a corner in an object made from a sandwich structure, comprising a core layer, which is arranged between two cover layers, at least one of which is a plastic cover layer.

2. Description of the Related Art

A method for manufacturing an object from a thermoplastic sandwich structure comprising object parts which are at an angle is known in the art. European patent 431,669 for example discloses a method for manufacturing an object from a thermoplastic sandwich material, in which the normals of at least two surfaces or object parts are at an angle to one another. This known method comprises at least the steps of softening a part of one of the surfaces of the thermoplastic sandwich material over a distance which corresponds to at least the length of an imaginary folding line of the corner between the two surfaces with the aid of a die, in which the die is pressed at least partially into the top layer of the thermoplastic sandwich material, and folding the two surfaces of the thermoplastic material about the folding line in such a manner that the surface which has been softened comes to lie on the inside of the corner as a result. This method results in an object having two surfaces which are at an angle to one another, in which the excess material of the softened top layer of the sandwich material is present on the inside of the corner, and is melted into the foam of the core in the folded position. This prevents the excess material from bulging out and thus ensures that a satisfactory fold or corner can be obtained. A drawback of such objects known in the art is the low strength thereof at the location of the corner as a result of the folded fibre-reinforced top layer. In particular the impact strength on the outside of the corner and the stiffness and/or strength leave something to be desired.

Generally, with sandwich structures based on a thermosetting core layer with thermosetting cover layers, such as honeycomb panels, the cover layer and, if desired, the honeycomb at the location of the corner to be formed are removed, the honeycomb is filled with a potting compound and the remaining potting compound is removed after the bending operation, following which the unit is hardened. Such a filling operation not only results in a significant increase in weight (although such sandwich structures are in fact intended for lightweight applications), but also increases the (local) stiffness and strength only slightly. In addition, when sandwich structures are being joined to one another, aluminium extruded parts are often used and/or strips are milled off the sandwich panel locally, into which the head ends of a sandwich panel which is to be joined therewith are placed. The abovementioned joints result in a significant increase in weight or a considerable local reduction in strength and stiffness.

It is an object of the present invention to reduce the abovementioned drawbacks and/or to provide an alternative method.

BRIEF DESCRIPTION OF THE DRAWINGS

The invention will be described below with reference to the attached drawings, in which.

DETAILED DESCRIPTION

Figure 1:
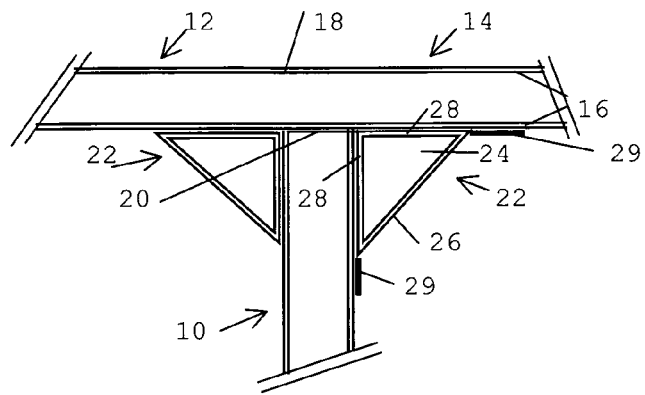
FIG. 1 shows a first embodiment of the method according to the invention.

To this end, the method for manufacturing and reinforcing a corner in an object made from a sandwich structure, comprising a core layer (which is arranged between two cover layers, at least one of which is a cover layer made of plastic, according to an embodiment of the invention) comprises the steps of: producing an object comprising a corner between two object parts; positioning a thermoplastic core part and an additional fibre-reinforced thermoplastic layer in the corner, which thermoplastic core part has a shape adapted to the corner, in such a manner that the additional fibre-reinforced thermoplastic layer substantially covers the exposed surface of the core part; and connecting a cover layer of the sandwich structure to the additional fibre-reinforced thermoplastic cover layer.

With the method according to an embodiment of the invention, an object which has a corner between two object parts thereof is first formed from a sandwich structure. The sandwich structure comprises a core layer having a cover layer at both main surfaces. Preferably, the core layer is made from a thermoplastic material, more preferably from a thermoplastic foam. One of the cover layers is a plastic cover layer, preferably a fibre-reinforced cover layer, most preferably a fibre-reinforced thermoplastic cover layer. More preferably, both cover layers are fibre-reinforced thermoplastic cover layers. The object parts may be two separate components which abut one another and enclose an angle. The object parts can also be connected to one another, as is the case, for example, with the angled panel according to European patent 431,669. According to an embodiment of the invention, the corner is reinforced by placing a thermoplastic core part therein having a shape adapted to the corner. The expression "a shape adapted to the corner" is intended to mean that the respective surface part of the core part substantially bears against the respective surface parts of the object parts.

The exposed side of the core part (the surface which does not contact the object parts or, expressed in yet another way, the surface turned away from the cover layer of the object parts) may have any suitable shape and is provided with an additional fibre-reinforced thermoplastic layer. The additional fibre-reinforced thermoplastic layer can be applied separately. Preferably, this layer is connected to the core part. A core part having a fibre-reinforced thermoplastic layer which is connected thereto as a cover layer is also referred to below as a reinforcing element. The additional fibre-reinforced thermoplastic layer is subsequently connected to the respective cover layer of the object parts. Advantageously, the additional fibre-reinforced thermoplastic layer overlaps the cover layer over a certain distance. The presence of the additional fibre-reinforced thermoplastic layer and the connection thereof to a cover layer of the object parts, which enclose an angle, reinforces the corner. In particular, the strength and stiffness thereof are increased. Advantageously, the additional fibre-reinforced thermoplastic layer is connected to the plastic cover layer of the object parts. In the case of a thermoplastic cover layer, the additional thermoplastic layer can easily be connected with the aid of heat and pressure, for example by pressing or welding, or with the aid of adhesive. The addition of material, in particular the additional fibre-reinforced thermoplastic layer, and the connection of the layers to one another results in a reinforcement of the corner, while the advantageous weight properties of the sandwich structures are retained.

Advantageously, the plastic cover layer, more preferably the fibre-reinforced cover layer, most preferably the fibre-reinforced thermoplastic cover layer of the object parts delimits the inside of the corner and the additional fibre-reinforced thermoplastic layer is connected to this cover layer. If the cover layer also comprises a thermoplastic, such a connection can be achieved by simply melting the thermoplastics together.

An embodiment of the invention uses a sandwich structure as starting material, which comprises a core layer, which is situated between two cover layers, at least one of which is a plastic cover layer. Advantageously, the sandwich structure comprises a non-solid thermoplastic core layer. Preferably, with a view to weight, strength and deformability, the core layer is a thermoplastic foam core. The same applies to said core part. As has already been mentioned above, the core layer is most preferably situated between two fibre-reinforced thermoplastic cover layers. The sandwich structure may advantageously be in the shape of a panel, in other words the surface dimensions (length and width) are relatively large with respect to the thickness. The sandwich structure may also be in the shape of a strip, which is turned into a reinforced angle section in the form of a bar-shaped construction element by means of the invention.

Preferably, the sandwich structures and reinforcing elements used in embodiments of the invention are produced by means of in-situ foaming, as is known, for example, from EP-A1-0 636463. Such a sandwich structure in the form of a panel consists of a foamed core layer, which is covered by two cover layers. At least one cover layer comprises one or more (fibre-reinforced) thermoplastic materials. The in-situ foaming process may include various steps. The first step is an assembly step, in which a core web, which comprises at least one film made of thermoplastic material, which material contains a certain amount of suitable blowing agent, is positioned between for example two (fibre-reinforced) cover layers, which are usually made from the same thermoplastic material as the core web. Subsequently, the unit made up of core web and cover layers is arranged between two press plates in a press. In this position, a foaming step is carried out, in which heat and pressure are applied to the unit via the press, so that the core web starts to foam and it is connected to the cover layer or cover layers at the same time. During this foaming step, the press is opened slowly when the temperature has become sufficiently high, as a result of which the distance between the two press panels increases. This allows the blowing agent (swelling agent, solvent, inert gas or combinations thereof) to expand, as a result of which the material of the core web will start to foam. This expansion is usually carried out under controlled conditions. In this manner, the core web is foamed, and the connection between the core web and the cover layer or layers is achieved in one single production step without a separate or additional adhesive being required. If a predetermined thickness of the foamed core web has been achieved, the unit is allowed to cool down in a cooling step. The product obtained in this manner comprises the foamed core web which is covered by two cover layers and connected thereto. In addition, a drying step is usually carried out.

Examples of swelling agents for a core layer comprising thermoplastic foam comprise acetone, methyl ethyl ketone, methyl acetate, methyl propionate, nitroethane, cyclohexane, ether, ethanol, methanol and pentane, as well as mixtures such as ethanol/acetone and methanol/methyl acetate. Acetone is a preferred swelling agent.

Examples of thermoplastics which are suitable for the core layer and the matrix of the fibre-reinforced cover layer comprise polyetherimide (PEI), polyethersulfone (PES), polysulfone (PSU), polyphenylsulfone (PPSU), polyketone such as polyetheretherketone (PEEK), liquid crystal polymers, polycarbonate (PC), propylene (PP), polyvinylchloride (PVC), polyethylene (PE) etc., as well as combinations thereof. Polyetherimide is a preferred thermoplastic and is available from General Electric in different grades under the trade name Ultem. Glass fibres are the preferred means of reinforcement. Other inorganic fibres, such as metal fibres, carbon fibres, and organic fibres such as aramide fibres and polypropylene fibres can be used in the same manner, provided that they can be deformed to a sufficient degree and can withstand the temperature required for deformation. In addition to the above synthetic fibres, it is also possible to use natural fibres. The fibres can be used in the form of mats, fabrics, chopped fibres and the like. Directional fibres, in particular unidirectional fibres, in which the fibre direction has been adapted to suit the intended use, can also be used advantageously. The material of the core layer and the core part, preferably a foam core, may, if desired, be reinforced with fibres of the abovementioned types or with nano particles. Preferably, the thermoplastic material of the core layer and/or the core part is the same as the thermoplastic material in the cover layers. However, combinations of different thermoplastics can also be used. Suitable examples thereof comprise, inter alia, PEI foam covered with cover layers made from PPSU, PS, PEEK or PC, PES or PPSU foam covered with cover layers made from PSU (polysulfone) or PC, and PP foam covered with cover layers made from polyamide, such as nylon.

The above examples apply analogously to any additional reinforcing layers which may be present. These may be used as a consolidated layer or as a prepreg, which may, per se, include several layers (plies) stacked on top of one another.

If desired, the core layer may also be composed of several layers which may be separated by an intermediate layer, such as for example an optionally fibre-reinforced (thermoplastic) layer, ceramic or metal layer.

Other methods for manufacturing a unit comprising a core layer and at least one fibre-reinforced thermoplastic cover layer inter alia comprise extruding a thermoplastic foam onto a fibre-reinforced thermoplastic cover layer, preferably between two such cover layers and gluing a (thermoplastic) foam to a fibre-reinforced thermoplastic cover layer. The adhesive used should be able to withstand the temperatures required for deformation. According to a particularly preferred embodiment of the invention, the method comprises the steps of: a) producing a corner between two parts of a sandwich structure comprising a core layer, preferably a thermoplastic core layer, which is situated between two cover layers, at least one of which is a plastic cover layer, preferably a fibre-reinforced cover layer, more preferably a fibre-reinforced thermoplastic cover layer, in such a manner that a depression is formed in the sandwich structure at the location of the corner, which depression has a predetermined shape; b) filling the depression with a reinforcing element comprising a thermoplastic core part having a side which has a shape which complements that of the predetermined shape of the depression, and at least one fibre-reinforced thermoplastic cover layer; and c) connecting the fibre-reinforced thermoplastic cover layer of the reinforcing element to a cover layer, preferably the fibre-reinforced, in particular the fibre-reinforced thermoplastic cover layer of the sandwich structure.

With this preferred embodiment of the method according to the invention, a corner is produced in a sandwich panel and a depression is produced at the corner position at the same time. For this purpose, for example a hot die can be used in the case of a thermoplastic core layer, which hot die deforms the respective cover layer and locally compresses the material of the core layer to form a more compact layer. If necessary, the respective cover layer may be interrupted beforehand, for example by means of cutting, milling or sawing. Advantageously, this depression extends up to the fibre-reinforced thermoplastic cover layer. Subsequently, the depression formed in this manner is filled with a reinforcing element. One side (=surface portion) of the reinforcing element fits into the depression. For further reinforcement of the corner, a further additional fibre-reinforced thermoplastic layer may be provided between this side and the bottom and the walls (if desired with the exception of the head ends) of the sandwich structure which delimit the depression. This further additional fibre-reinforced thermoplastic layer is then connected to a cover layer, most preferably a fibre-reinforced thermoplastic cover layer of the sandwich structure using one or more of the above-described connecting techniques, such as pressing, (induction) welding or gluing. The additional fibre-reinforced thermoplastic layer of the reinforcing element is also connected to the cover layers delimiting the depression. The depression may be provided both on the outside and on the inside of the corner to be formed. Advantageously, the additional fibre-reinforced thermoplastic cover layer in the finished product extends from the (fibre-reinforced thermoplastic) cover layer on a surface of the sandwich structure to the other cover layer at the opposite surface. This improves the (bending) stiffness. In a reinforcing element, the additional fibre-reinforced thermoplastic layer is applied to the respective side of the core part thereof beforehand. It will be understood that it is also possible to use a separate thermoplastic core part and separate additional fibre-reinforced thermoplastic layer.

A preferred embodiment of the reinforcing element has an elongate shape, the longitudinal sides of which comprise a fibre-reinforced thermoplastic cover layer. If desired, the head ends may be provided with an optionally fibre-reinforced plastic cover layer, preferably a thermoplastic cover layer. With such an embodiment, both the additional and the further additional fibre-reinforced thermoplastic cover layer are connected to the thermoplastic core part. A preferred method, in particular step a), comprises the substeps of:

1) providing a sandwich structure comprising a thermoplastic core layer, which is situated between two thermoplastic cover layers, at least one of which is a fibre-reinforced thermoplastic cover layer;
2) providing an interruption in a cover layer of the sandwich structure at the position of the corner to be produced;
3) folding the edges of the cover layer adjacent to the interruption in the thermoplastic cover layer, in such a manner that a depression is created in the sandwich structure;
4) bending the sections of the sandwich structure adjacent to the formed depression, in order to form a sandwich structure with said depression in a corner position, which depression has a predetermined shape.

With this preferred embodiment, an interruption, such as an incision having a length corresponding to an (imaginary) folding line is provided in the (optionally fibre-reinforced) thermoplastic cover layer, which is situated opposite the at least one fibre-reinforced thermoplastic cover layer of the sandwich structure, advantageously at or near the position of the corner to be formed. Thereafter, the edges of the incision are deformed by applying pressure and heat, for example using a hot die. In this case, the edges of the cover layer, which delimit the interruption, are bent towards the other fibre-reinforced thermoplastic cover layer and the core layer is compressed at the same time. If desired, an additional fibre-reinforced thermoplastic reinforcing layer can be laid over the incision, prior to the deformation step, and be deformed at the same time. Thus, a depression is formed, the walls of which are at least partially delimited by the deformed edges of the cover layer. Preferably, the depression extends up to the fibre-reinforced thermoplastic cover layer, which thus forms the bottom of the depression. Thereafter or at the same time, the parts of the object on the sides of the depression are bent around the (imaginary) folding line to form a desired corner. Said bending operation may be performed in such a manner that the walls of the depression are moved towards one another, but also in such a manner that the walls of the depression are moved away from one another. In the first case, an angled sandwich panel is produced, in which the depression is situated on the inside of the corner. In the second case, the depression is situated on the outside of the corner. Subsequently, a thermoplastic core part and at least one fibre-reinforced thermoplastic layer, either as separate parts or as an integrated reinforcing element, are positioned in the depression at the location of the corner. The latter embodiment is preferred. Thus, the reinforcing element fits into this depression. The reinforcing element is connected to the sandwich structure, for example by means of welding or gluing. In this manner, the stiffness/strength of the corner and the impact strength are increased by the addition of material, in particular the fibre-reinforced thermoplastic cover layer. An angled sandwich panel produced in this manner thus has a high impact strength and a good transmission of force, while the increase in weight is only very small. This is particularly important for aeroplane trolleys, galleys and luggage bins.

When two separate object parts, each having a local depression or recess at an edge (for example produced by means of a hot deformation die), are positioned at an angle with respect to one another and with aligned depressions or recesses, a simultaneous coupling and reinforcement of the corner can be produced with the aid of such a reinforcing element, which is placed in the aligned depressions or recesses and is connected to the object parts.

If desired, an additional reinforcing profile, such as a fibre-reinforced thermoplastic layer, can be placed on the outside of a corner, in particular with two loose object parts. Such a profile may also form an integral part of the deformed edge of an object part.

The core part preferably has a thickness (measured at right angles to the surface of the fibre-reinforced thermoplastic layer thereof which is to be provided thereon or has already been provided thereon) which is greater than the thickness of the thinnest object part, more preferably greater than the thickness of both object parts. In a preferred embodiment, the reinforcing element has securing edges which, after positioning in the depression, rest against the cover layers of object parts adjacent to the depression. Advantageously, these securing edges are integral with said fibre-reinforced thermoplastic cover layer. These edges can also be pressed, welded or glued onto the respective cover layer. Advantageously, such a securing edge is formed by pressing and melting together a top and bottom fibre-reinforced thermoplastic layer when producing the reinforcing element from a strip of material having a sandwich structure, comprising two fibre-reinforced thermoplastic layers with a thermoplastic core part in between.

At positions where two or more non-parallel reinforcing elements converge, such as, for example, at corners of a rectangular body, a filler body may be placed locally, preferably consisting of a thermoplastic core and a fibre-reinforced thermoplastic cover layer, with the thermoplastic cover layer being situated on the exposed part of the core body.

Welding may, for example, be performed by pressing a thermoplastic cover layer, for example reinforced with metal wires or carbon fibres, onto the side of the reinforcing element, which side comes to lie against the walls of the depression. By means of, for example, resistance or induction welding, a connection can be produced between, on the one hand, this fibre-reinforced thermoplastic cover layer of the reinforcing element and the depression-delimiting walls made of (fibre-reinforced) cover layer material, on the other hand.

According to a further advantageous embodiment, the method furthermore comprises manufacturing a reinforcing element according to the steps of: a) providing a sandwich structure comprising a thermoplastic core part, which is situated between two cover layers, at least one of which is a fibre-reinforced thermoplastic cover layer; b) deforming the side of the sandwich structure opposite the fibre-reinforced thermoplastic cover layer to form a reinforcing element which has at least a peripheral part which has a shape which complements the predetermined shape of the depression is provided with a preferably also fibre-reinforced, thermoplastic cover layer.

The embodiments and details of the reinforcing element described earlier also apply in this case.

An embodiment of the invention also relates to an object made from a sandwich structure having a reinforced corner, comprising two parts which are at an angle to one another and made from a sandwich structure comprising a core layer, which is situated between two cover layers, at least one of which is a plastic cover layer, in which the object, at the corner, comprises a depression of a predetermined shape in the sandwich structure, in which depression a thermoplastic core part which, at least on the peripheral part thereof, has a shape which complements the predetermined shape of the depression and in which the exposed surface part is provided with a fibre-reinforced thermoplastic layer, and in which the fibre-reinforced thermoplastic layer of the reinforcing element is connected to a cover layer of the sandwich structure. The object may, for example, be a (part of a) trolley, galley or luggage bin for an aeroplane or another (air) transport means. The above-described embodiments and details also apply to this aspect of the invention.

In some embodiments, a further aspect of the present invention is the application of a reinforcing element, as described above and which comprises a thermoplastic core covered in the longitudinal direction on all sides with fibre-reinforced thermoplastic cover layers, when joining plastic elements, such as panels, in particular thermoplastic plastic panels, preferably fibre-reinforced plastic panels, most preferably fibre-reinforced thermoplastic panels, to one another. This aspect of an embodiment of the invention relates to the use of a reinforcing element, which comprises a thermoplastic core part which is covered with a fibre-reinforced plastic cover layer on the longitudinal surfaces (and, if desired, on the head ends) when joining plastic panels and/or elements to one another, for connecting the plastic panels or elements and reinforcing the connection.

FIG. 1 shows a first embodiment of the method according to the invention. Two sandwich panels 10 and 12 are connected to one another. Each panel 10, 12 has a sandwich structure 14, which in this case comprises two fibre-reinforced thermoplastic cover layers 16, between which there is a thermoplastic foam layer 18. Such a panel is advantageously produced by means of the in-situ foaming method, as has been described above. A head end 20 of panel 10 is placed on the cover layer 16 of panel 12, so that the panels 10 and 12 in each case enclose an angle of 90°. In this case, a reinforcing element 22 is provided in both corners. In this embodiment, a reinforcing element 22 comprises a thermoplastic core part 24, advantageously made of foam, which is provided on all sides with a fibre-reinforced thermoplastic cover layer 26. Seen in cross section, the reinforcing element 22 is in the shape of a rectangular triangle. The sides 28 adjacent to the right angle thereof are parallel to the respective surfaces (cover layers 16) of the panels 10 and 12, respectively. By means of, for example, welding or gluing, the fibre-reinforced thermoplastic cover layers of the reinforcing element 22 are connected to the fibre-reinforced thermoplastic cover layers 16 of the panels 10 and 12. In this figure, the sharp corners of the right-hand reinforcing element 22 are provided with securing edges 29, which run parallel to the surfaces (cover layers 16) of the panels 10 and 12 and are attached thereto by means of, for example (hot) welding or gluing.

Figure 2:
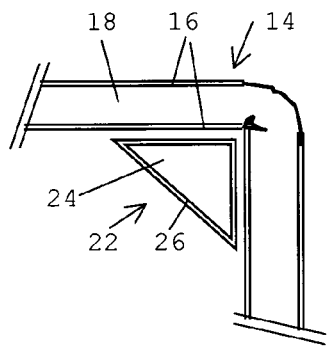
FIG. 2 shows a second embodiment of the method according to the invention.
Figure 3:
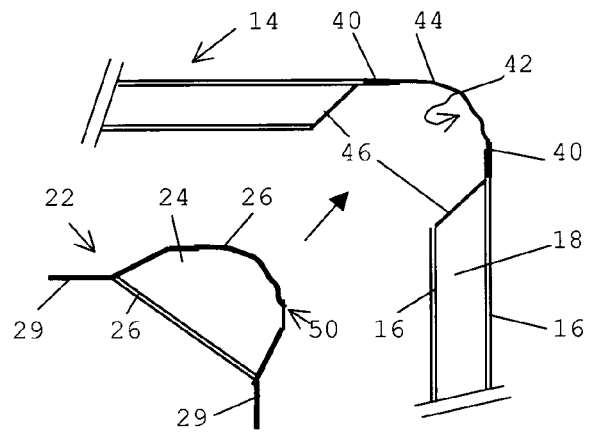
FIG. 3 shows a third embodiment of the method according to the invention.

In the figures to be discussed below, components which are identical to those in FIG. 1 are indicated by the same reference numerals. FIG. 2 shows a sandwich structure 14 with a corner, produced for example according to the method described in EP-A-431,669, in which a part of the fibre-reinforced thermoplastic cover layer 16 is folded in the corner after softening. According to an embodiment of the invention, this corner is reinforced with a reinforcing element 22. This reinforcing element 22 is essentially constructed as has already been described in FIG. 1. FIG. 3 shows a preferred embodiment of the method according to the invention. A sandwich panel 14 comprises two fibre-reinforced thermoplastic cover layers 16 and a thermoplastic foam core 18. In a cover layer 16 thereof, an incision is made over the length of the corner to be formed (folding line). Using a hot die (not illustrated), the edges 40 of this cover layer 16 on either side of the incision are deformed and pressed to the other fibre-reinforced thermoplastic cover layer 16. In the situation illustrated, the deformed edge parts 40 extend up to the other cover layer 16. Thus, a depression 42 is formed, the bottom 44 of which, in cross section, is formed by the fibre-reinforced thermoplastic cover layer 16 which is partially overlapped by the edge parts 40. The oblique walls 46 (diverging widely, viewed from the bottom 44 of the depression 42) is formed by the deformed edge parts 40. In the depression 42, a reinforcing element 22 is placed which has a peripheral part 50 (viewed in cross section) which is identical to the inner periphery of the depression 42. The reinforcing element 22 comprises a core part 24 made of thermoplastic foam which is covered on the flat underside with a fibre-reinforced cover layer 26. In this case, said peripheral part 50 is also covered with a fibre-reinforced cover layer 26. The reinforcing element 22 is glued or welded into the depression 42, so that there is at least a connection between the fibre-reinforced cover layer 16 on the inside of the corner and the fibre-reinforced layer 26 of the reinforcing element 22. The reinforcing element 22 is provided with securing edges 29, preferably an "extension" of the fibre-reinforced thermoplastic cover layers 26. These edges 29 result in an enlargement of the attachment surface, which is, in addition, more readily accessible for a connecting operation such as pressing or welding.

Figure 4:
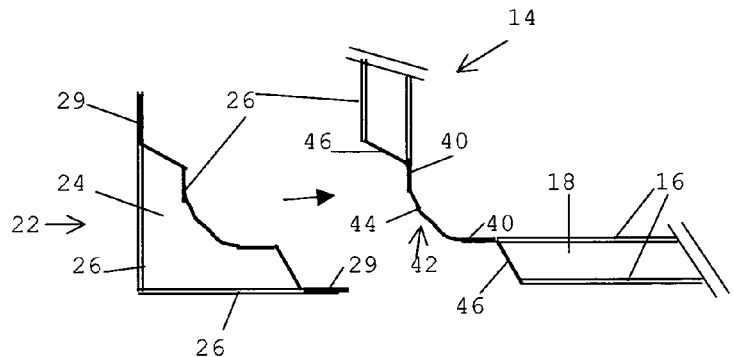
FIG. 4 shows a fourth embodiment of the method according to the invention.

FIG. 4 shows another embodiment, in which the depression 42 is provided on the outside of the corner, which is reinforced with a reinforcing element 22.

Figure 5:
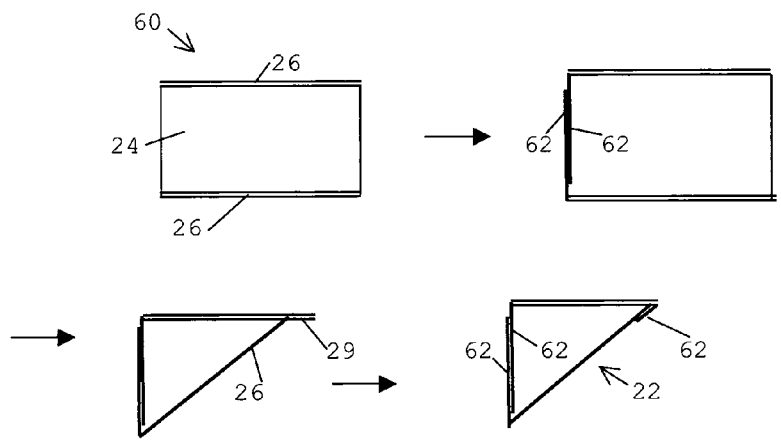
FIG. 5 shows an embodiment of a substep of the method according to the invention.
Figure 6:
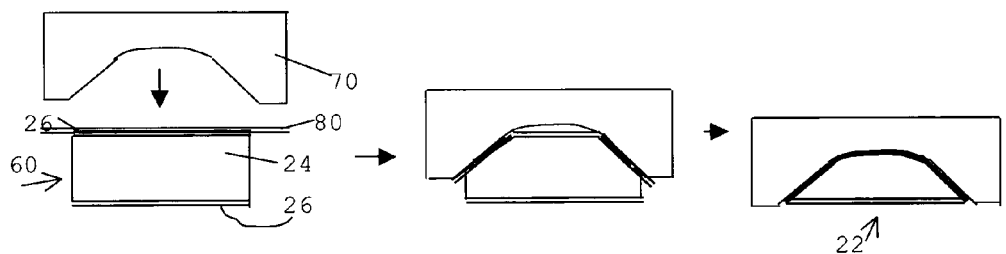
FIG. 6 shows a second embodiment of a substep of the method according to the invention.

FIGS. 5 and 6 show a method for manufacturing a reinforcing element 22. A strip of sandwich material 60 comprising a thermoplastic foam 24 (having a greater thickness than the sandwich material of the object itself) which is covered on two sides with a fibre-reinforced thermoplastic cover layer 26, is first deformed at an edge 62 of a first cover layer 26 using a hot die (not illustrated), so that this edge 62 covers the free side of the foam 24. Subsequently, the second cover layer 26 is treated in the same way, so that the side which was originally free is covered by two cover layer edges 62. In a similar manner, the second cover layer 26 on the other side of the strip 60 is deformed using a hot die having a suitable shape (for example triangular head in cross section), following which the projecting edge 62 of the first cover layer 26 is folded over the deformed second cover layer 26. If it is not folded over, this projecting edge 62 can also serve as a securing edge 29, in which case a part of the cover layer 26 is advantageously pressed at the same time to form part thereof. If desired, one or more additional fibre-reinforced thermoplastic layers may be applied to the cover layer or foam may be removed, prior to the deforming steps. FIG. 6 shows a method for manufacturing another embodiment of a reinforcing element 22 using a hot die 70 for use with the method described in FIG. 3. Advantageously, an additional fibre-reinforced thermoplastic cover layer 80 of greater dimensions can be placed on the top cover layer 26, which is deformed at the same time as and bonds with the deformed cover layer 26. If the edges of the additional layer extend beyond the body of the element covered with cover layer 26, they can serve as securing edges or lips.

The above reinforcing element can also be made from a strip of thermoplastic foam material or finished sandwich structure having one or more further thermoplastic fibre-reinforced layers on one or two sides, after which the combination is pressed to form a reinforcing element in one or more steps, with the edges of the further layer advantageously extending beyond the body of the element covered with and can serve as securing edges or lips.

By adding a core part and an additional fibre-reinforced thermoplastic layer, sandwich structures can also be strengthened and stiffened locally, which improves the possibilities for introducing forces. Another aspect of the invention relates to a method for manufacturing a local reinforcement in a sandwich structure, comprising a core layer, which is situated between two cover layers, at least one of which is a fibre-reinforced thermoplastic cover layer, which method comprises the steps of: placing a thermoplastic core part on the at least one fibre-reinforced thermoplastic cover layer, placing an additional fibre-reinforced thermoplastic layer over the core part and connecting the additional fibre-reinforced thermoplastic layer to the fibre-reinforced thermoplastic cover layer by melting them together. Prior to the connecting step, the core part may, if desired, be attached to the sandwich structure, for example using adhesive or by melting them together. Preferably, said attachment or connection takes place during the connecting step itself, advantageously using a hot die. Depending on the shape of such a die, the additional fibre-reinforced thermoplastic layer and the core part may be deformed during the connecting step, in which case the core part may be compressed. If desired, the fibre-reinforced thermoplastic cover layer of the sandwich structure may be interrupted and/or removed locally, for example by means of cutting, sawing or milling, and, if desired, the core part can also be attached during this process. As has been explained above, the core part and the additional fibre-reinforced thermoplastic layer may be connected to form a reinforcing element instead of being separate components. Such a reinforcing element may have any suitable shape, including one or more projecting securing edges.

Figure 7:
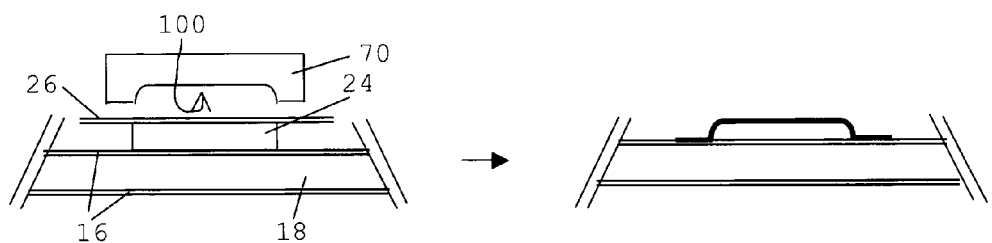
FIG. 7 shows another aspect of the invention.

The explanation given above regarding choice of material and construction of the sandwich structure, core part and additional fibre-reinforced thermoplastic layer also applies to this aspect of the invention. This aspect is explained further with reference to FIG. 7. This FIG. 7 shows a sandwich panel 10, which in this case comprises two fibre-reinforced thermoplastic cover layers 16, between which there is a thermoplastic foam core layer 18. A core part 24 made of thermoplastic foam is placed on top of cover layer 16 and an additional fibre-reinforced thermoplastic layer 26 is placed on top thereof, said layer 26 extending beyond the edges of the core part 24. Using a hot die 70 having a predetermined mould cavity 100, the layer 26 and the core part 24 are deformed, and the projecting edges of layer 26 melt together with the top cover layer 16.

Figure 8:
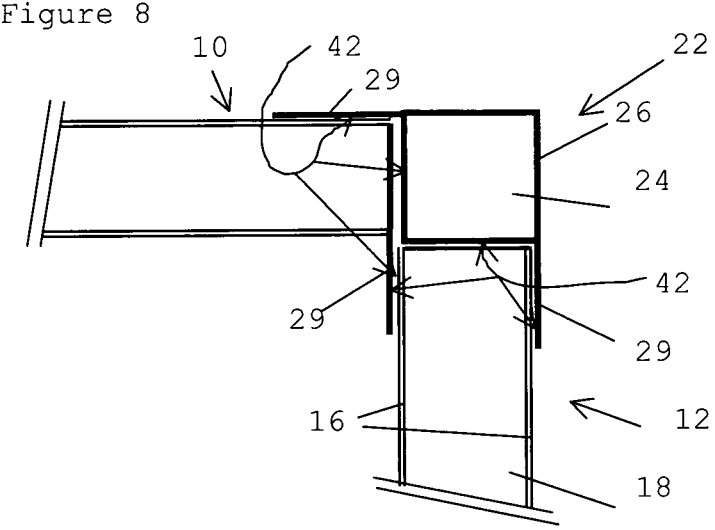
FIG. 8 shows a further aspect of the invention.

FIG. 8 shows yet another aspect of the invention, i.e. an embodiment of a joint between two sandwich panels 10 and 12. A corner-reinforcing element 22 is placed in order to produce the connection 42. The reinforcing element 22 comprises a core part 24 made of thermoplastic foam and is covered on all sides with a fibre-reinforced thermoplastic cover layer 26. The reinforcing element 22 is glued or welded to the sandwich panels 10 and 12, so that there is at least a connection between the fibre-reinforced cover layer 16 on the inside of the corner and the fibre-reinforced layer 26 of the reinforcing element 22. The reinforcing element 22 is provided with attachment edges 29, preferably an "extension" of the fibre-reinforced thermoplastic cover layers 26. The sandwich panel 10 is also preferably provided with a securing edge 29. These edges 29 result in an enlargement of the attachment surface, which is, in addition, more readily accessible for a connecting operation such as pressing and welding. The reinforcing element 22 itself May be made from a sandwich panel comprising two fibre-reinforced thermoplastic cover layers with a thermoplastic foam core layer in between.

Figure 9:
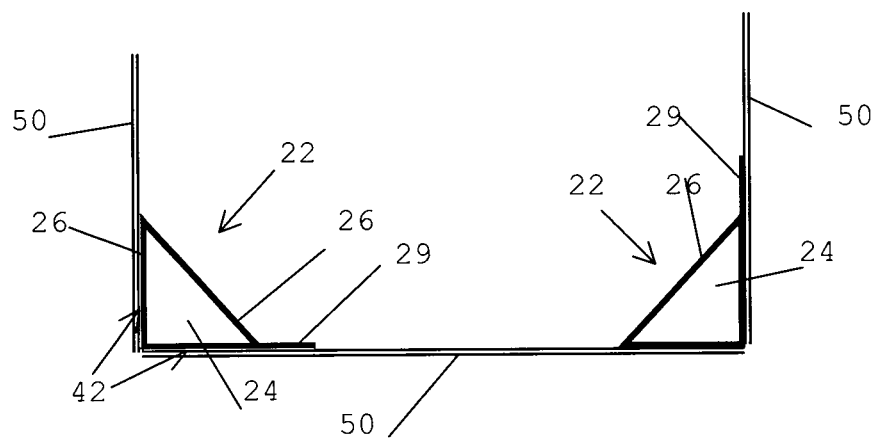
FIG. 9 shows an embodiment of a connection of construction elements with solid layers.

FIG. 9 shows a further embodiment of the joint between solid plastic panels 50 according to the invention. A corner-reinforcing element 22 is used for the connection 42. The reinforcing element 22 made from a strip of sandwich material as described above comprises a core part 24 made of thermoplastic foam, which is covered on all sides in the longitudinal direction with a fibre-reinforced thermoplastic cover layer 26. The reinforcing element 22 is glued or welded to the solid layers 50, so that there is at least a connection between the solid layer on the inside of the corner and the fibre-reinforced layer 26 of the reinforcing element 22. The reinforcing element 22 is preferably provided with attachment edges 29, preferably an "extension" of the fibre-reinforced thermoplastic cover layers 26. These edges 29 result in an enlargement of the attachment surface, which is, in addition, more readily accessible for a connecting operation, such as pressing and welding.

The invention claimed is:

1. Method for manufacturing and reinforcing a corner in an object made from a sandwich structure, comprising a core layer, which is arranged between two cover layers, at least one of which is a plastic cover layer, which method comprises the steps of:
   a) producing an object comprising a corner between two object parts, in such a manner that a depression is formed in the sandwich structure at the location of the corner, which depression has a predetermined shape;
   b) filling the depression with a reinforcing element comprising a thermoplastic core part having a side which has a shape which complements that of the predetermined shape of the depression, and at least one fibre-reinforced thermoplastic cover layer substantially covering the exposed surface of the thermoplastic core part; and
   c) connecting a cover layer of the sandwich structure to the fibre-reinforced thermoplastic layer of the reinforcing element.

2. Method according to claim 1, in which the at least one plastic cover layer of the sandwich structure is a fibre-reinforced cover layer.

3. Method according to claim 2, wherein the fibre-reinforced cover layer is a fibre-reinforced thermoplastic cover layer.

4. Method according to claim 1, in which the plastic cover layer delimits the inside of the corner and the additional fibre-reinforced thermoplastic layer is connected to the plastic cover layer.

5. Method according to claim 1, in which the core layer of the sandwich structure comprises a thermoplastic material.

6. Method according to claim 1, in which the core layer of the sandwich structure and/or the thermoplastic core part comprises a thermoplastic foam layer.

7. Method according to claim 1, in which the sandwich structure comprises two fibre-reinforced thermoplastic cover layers.

8. Method according to claim 1, in which the reinforcing element has an elongate shape, the longitudinal sides of which comprise a fibre-reinforced thermoplastic cover layer.

9. Method according to claim 1, in which the reinforcing element is provided with one or more securing edges which extend parallel to one of the cover layers of the sandwich structure.

10. Method according to claim 9, in which the securing edges are integral with the fibre-reinforced thermoplastic cover layer of the reinforcing element.

11. Method for manufacturing and reinforcing a corner in an object made from a sandwich structure, comprising a core layer, which is arranged between two cover layers, at least one of which is a plastic cover layer, which method comprises the steps of:

1) providing a sandwich structure comprising a thermoplastic core layer, which is situated between two cover layers, at least one of which is a fibre-reinforced thermoplastic cover layer;
   2) providing an interruption in a cover layer of the sandwich structure at the position of the corner to be produced;
   3) folding the edges of the cover layer adjacent to the interruption in the thermoplastic cover layer, in such a manner that a depression is created in the sandwich structure;
   4) bending the sections of the sandwich structure adjacent to the formed depression, in order to form a sandwich structure with said depression in a corner position, which depression has a predetermined shape;
   5) positioning a thermoplastic core part and a fibre-reinforced thermoplastic layer in the corner, which thermoplastic core part has a shape adapted to the corner, in such a manner that the fibre-reinforced thermoplastic layer substantially covers an exposed surface of the core part; and
   6) connecting a cover layer of the sandwich structure to the additional fibre-reinforced thermoplastic layer.

12. Method according to claim 1, in which the method furthermore comprises manufacturing a reinforcing element, comprising the steps of
   providing a sandwich structure comprising a thermoplastic core part, which is situated between two cover layers, at least one of which is a fibre-reinforced thermoplastic cover layer; and
   deforming the side of the sandwich structure opposite the fibre-reinforced thermoplastic cover layer to form a reinforcing element which has at least a peripheral part which has a shape of a cover layer which complements the predetermined shape of the depression.

13. Method according to claim 1, in which the thermoplastic core part has a thickness which is greater than the thickness of the core layer of the sandwich structure.

14. Object made from a sandwich structure having a reinforced corner, comprising two parts which are at an angle to one another and made from a sandwich structure comprising a core layer, which is situated between two cover layers, at least one of which is a plastic cover layer, in which the object, at the corner position, comprises a depression of a predetermined shape in the sandwich structure, in which depression there is situated a reinforcing element, comprising a thermoplastic core part which, at least on the peripheral part thereof, has a shape which complements the predetermined shape of the depression and in which the exposed surface part is provided with a fibre-reinforced thermoplastic layer, and in which the fibre-reinforced thermoplastic layer of the reinforcing element is connected to a cover layer of the sandwich structure.

* * * * *